United States Patent Office 3,471,304
Patented Oct. 7, 1969

3,471,304
EDIBLE COATING COMPOSITIONS
Mokhtar M. Hamdy and Howard S. White, Minneapolis, Minn., assignors to Archer-Daniels-Midland Company, Minneapolis, Minn., a corporation of Delaware
No Drawing. Filed Mar. 7, 1966, Ser. No. 532,070
Int. Cl. A23b 1/10, 7/16; C08b 21/26
U.S. Cl. 99—166         14 Claims

ABSTRACT OF THE DISCLOSURE

Edible food coating compositions comprising a homogeneous blend of (A) a cellulose ether (e.g., ethyl cellulose), (B) a monoglyceride (e.g., diacetylated stearyl glyceride), and (C) a metal salt of a fatty acid (e.g., calcium stearate). The compositions can be applied to food products as a melt or as a solution in a solvent to produce moisture resistant films.

The present invention relates to edible coating compositions, to methods for preparing coated food products, and to coated food products obtained with such edible coating compositions.

Although the coating of food to protect such food against oxidative degradation, mold attack, and moisture penetration is well-known, most coatings employed for such purposes are not edible and must be removed before the food can be consumed. If the coating employed adheres well to the food product, the removal of such coating can be difficult and time-consuming. Additionally, if the food product is brittle and fragile, the food product can break during the stripping of the coating, making the consumption of the food difficult and resulting in the loss of food product. An edible food coating which does not require removal prior to consumption of the food product and which affords the necessary protection, particularly against moisture penetration, is therefore highly desirable. A particular problem in the protection of food products with edible coatings exists with respect to dehydrated foods such as obtained by the well-known freeze-drying processes. With respect to such foods, it is not only desirable to coat the product with an edible coating which protects against oxidative degradation, mold attack, and moisture penetration, but it is furthermore necessary, if the coating is not to be removed, that such coating does not interfere with the rehydration of the food product.

Recently developed coating techniques which are of particular economic value in the coating of food products have added additional requirements to food coating compositions which are particularly difficult to meet insofar as edible food coating compositions are concerned. In these novel coating techniques, the coating composition is extruded in the form of a molten sheet which is caused to envelop the food product to be coated. By using this technique, diluents and solvents frequently necessary in coating compositions are avoided, as well as the step of removing diluent from or drying the coating subsequent to its application. Edible coating compositions which have the desired thermal stability to be melt-extruded are deemed to constitute a significant advance in the preparation of storable and shippable food products.

It is, therefore, an object of the present invention to provide an edible coating composition.

It is another object of the present invention to provide compositions which result in edible food coatings having superior moisture barrier properties.

It is a further object of the present invention to provide compositions which result in edible food coatings which protect dehydrated food products against moisture penetration while still allowing such food products to be rehydrated.

Still another object of the present invention is to provide an edible coating composition of sufficient thermal stability to allow its melt extrusion and coating of food products in the form of a melt.

A still further object of the present invention is to provide a method of preparing coated food products having an edible coating.

Yet another object of the present invention is to provide melt-coated food products in which the coating is edible and which protects the food against moisture penetration.

Other objects of the present invention will become apparent from the following description and claims.

The edible coating composition of the present invention comprises a homogeneous blend of (a) 25% to 50% by weight of the total composition of an edible cellulose ether, said cellulose ether containing from 2.1 to 2.7 ether groups per glucose unit, said ether groups being preferably, methoxy or ethoxy groups; (b) 25% to 60% by weight of the total composition of glyceride having the formula:

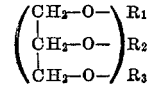

wherein $R_1$ is an acyl radical derived from a fatty acid having 6 to 20, preferably 12 to 18, carbon atoms per molecule, $R_2$ is a lower acyl radical derived from a lower aliphatic carboxylic acid having 1 to 8, preferably 2 carbon atoms, and $R_3$ is hydrogen or the same as $R_2$; and (c) from 5% to 25% by weight of the total composition of a metal salt of a fatty acid having from 16 to 22 carbon atoms. The term "fatty acid" as employed herein is meant to define aliphatic carboxylic acids. The above formula is written to indicate that any of the R-radicals can be attached to any of the oxygens of the glycerol molecule.

The use of cellulose ethers in food coating compositions is well known. Cellulose ethers, by themselves, however, are generally considered to be unsuitable for coating in view of their brittleness or lack of resiliency, flexibility, and plasticity. Plasticizers which have heretofore been employed in combination with the cellulose ethers are either of the non-edible type or, if edible, have detracted from the thermal stability and barrier properties of the cellulose ether. Additives suggested for cellulose ether coating compositions have included acetylated monoglycerides of fatty acids. However, the melt flow properties and the thermal stability of edible coating compositions involving cellulose ethers and aceto-monoglycerides make such compositions unsuitable for the above-described melt-coating techniques. The present invention is based on the discovery that a combination of cellulose ethers, acylated fatty glycerides, and metal salts of fatty acids in the above-indicated proportions results in an edible coating composition which, in addition to exhibiting superior barrier properties, is thermally stable at the temperatures required for melt extrusion and can be melt-extruded into strong, continuous coatings.

The cellulose ethers employed in the coating composition of the present invention are edible cellulose ethers containing between 2.1 and 2.7 ether groups per glucose unit in the cellulose polymer chain. In general, edible cellulose ethers contain alkoxy groups of not more than 4 carbon atoms and are preferably methoxy or ethoxy groups. Although both methyl cellulose and ethyl cellulose are readily available, ethyl cellulose is the most preferred cellulose ether. The ethoxyl content of ethyl cellulose employed in the practice of the present invention is generally in the range of 45% to 50% by weight, preferably in the range of 48.0% to 49.5% by weight. The viscosity, as determined in a solution of about 5% by weight of the ethyl cellulose in a solvent mixture consisting of about 80 parts by volume of toluene and about 20 parts by volume of ethanol, can be from about 6 to about 200 cps., measured at 20° C. Ethyl cellulose, which has a viscosity of less than about 50 cps. is, in general, preferred because the lower molecular weight of the polymer makes the polymer more suitable for melt extrusion.

The second component employed in forming the coating composition is a glyceride which contains one long chain aliphatic acyl radical derived from a "fatty acid" having the above-indicated formula. Although the glyceride can contain one unreacted hydroxyl group, it is greatly preferred to employ glycerides in which all three hydroxyl groups are esterified. Particularly preferred glycerides are those which contain one fatty acid radical and two acetyl groups, i.e., acetylated monoglycerides. Suitable fatty acids employed to form the monoglyceride include stearic acid, palmitic acid, myristic acid, and lauric acid. The monoglycerides of unsaturated fatty acids can also be employed, although their oxidative stability at elevated temperatures is inferior to that of the above-described saturated acids which are, therefore, preferred. Examples of unsaturated fatty acids include sorbic, oleic acid, linoleic acid, and erucic acid. The monoglycerides employed in the present invention need not be pure compounds, but can be glycerides derived from mixtures of fatty acids.

The third component employed in the coating composition is a metal salt of a fatty acid having from 16 to 22 carbon atoms. Although the fatty acid salt of any metal can be employed, the preferred salts are those of alkaline earth metals and earth metals such as magnesium, calcium, barium, and aluminum. The preferred fattty acids employed to form the salts are saturated fatty acids such as stearic acid, lauric acid, palmitic acid, and myristic acid. However, unsaturated fatty acids such as oleic acid and erucic acid can also be employed to form the metal salt, although the oxidative stability of these acids is not as good as those of the saturated fatty acids. The salt may be derived from mixtures of metals, as well as mixtures of fatty acids. Suitable metal salts include calcium stearate, calcium laurate, aluminum stearate, barium stearate, calcium palmitate, magnesium stearate, and aluminum laurate. Calcium stearate and aluminum stearate have been found to be particularly effective.

The coating compositions are obtained by admixing the components until the desired degree of homogeneity is achieved. The term "homogeneous blend" as employed herein is intended to define a degree of mixing such that in films prepared therefrom the components cannot be distinguished by optical examination. The order in which the components are admixed is not critical. Although extremely homogeneous blends are obtained if the components are admixed in the form of solution and thereafter separated from the solvent, such is, in general, not necessary. In general, highly uniform mixtures are obtained by bulk-blending the components and then feeding the particulate mixture to a melt extruder of the type employed in the extrusion of plastics in which the extrusion screw contains a mixing and melting section. Such extruders are well-known in the art and result in a uniform melt at the die orifice of the extruder when employing the composition of the present invention. It is to be understood, however, that the composition can also be formed by employing any of the other means known to the art of melt blending ingredients such as using a rubber mill or a Banbury mixer.

By weight of the total composition, the coating materials of the present invention contain from 25% to 50% of the cellulose ether, from 25% to 60% of the monoglyceride, and from 5% to 25% of fatty acid metal salt. In a preferred embodiment, the coating composition contains from 35% to 50% of the cellulose ether, from 45% to 55% of the monoglyceride, and from 15% to 20% of the fatty acid metal salt.

As indicated above, the described coating compositions are particularly suitable in coating techniques involving the extrusion of a sheet which is placed over the food product with the aid of suction, while still in molten form. This technique is known as curtain-coating and the process is commercially available under the trade name "Eastoflow." The described coating compositions melt in the range of 90° C. to 100° C. and form stable melts up to temperatures of 170° C. and above. Coherent and yet fluid and workable melts are obtained in the range of 150° to 160° C., at which temperatures the material is preferably extruded and coated onto the food product. Although the coating compositions of the present invention are particularly useful in the melt-extrusion coating of food products, they can also be employed in more conventional coating techniques such as dipping, brushing, and spraying. These latter operations can be conducted employing a melt of the coating composition or by employing dilute solutions thereof.

The optimum thickness of a coating employing the aforedsecribed compositions will vary, depending on the particular food product involved, the degree of protection desired, and the storage environment. In general, however, coatings which result in an increase of more than 30% by weight of the food product coated are not preferred. As a general rule, the coating should have sufficient thickness to assure a continuous coating and give the desired degree of protection. Employing the described curtain-coating techniques, the thickness of the coating can be readily controlled by the thickness of the extruded sheet, the extrusion rate, and the rate at which a product is passed through the melted sheet.

Although the coatings of the present invention provide a substantial protection against oxidative degradation of the coated food product, it may be desirable, depending on the storage environment, to provide additional protection against oxidative degradation of the coated food product. This can be readily accomplished by spraying the food product, either before or after coating, with a protein dispersion to provide a thin protein coating which is particularly effective against oxidative degradation. In effect, a coating laminate is formed in this manner. The adhesion between the protein coating and the coating compositions of the present invention is surprisingly good.

The coating compositions of the present invention are of particular utility in the coating of dehydrated food products such as dehydrated meats, vegetables, and fruits to improve their storage life and protect such foods against moisture penetration. The rehydration of dehydrated foods coated with the described coating compositions is achieved by heating the coated food product in water at elevated temperatures close to the boiling point of water. The hydration of the coated food products is accomplished to substantially the same extent as the hydration of the uncoated food product. The utility of the melt extrudable, edible coating compositions is, however, not limited to dehydrated foods and the compositions can be employed in the coating of frozen foods such as frozen meats and vegetables, as well as unmodified, e.g., raw or fresh food products, to improve the storage life of such products.

Additives which reduce the growth of microorganisms can be incorporated into the described coating compositions. Such additives or preservatives include sorbic acid, potassium sorbate, methyl p-hydroxybenzoate, sodium benzoate, sodium propionate, and propyl p-hydroxylbenzoate. The addition of even small concentrations of such preservatives results in a marked improvement in reducing or preventing the growth of microorganisms. Adequate protection against the growth of microorganisms is obtained if the concentration of the preservative in the coating constitutes about 0.01% to 0.2% by weight of the coated food product. In addition, suitable antioxidants approved for food use can be included in the coating compositions.

The coatings obtained with the described edible coating compositions are strong and yet flexible and resilient, even in the form of thin films. Continuous, pinhole-free coatings are readily obtained. The mechanical film properties of the described coating compositions are particularly valuable in the coating of fragile, brittle food products which tend to fall apart and crumble when subjected to mechanical shock or stress during shipment, storage, or use. In effect, the coatings made from the described compositions can be employed as a means of packaging fragile food products.

The invention is further illustrated by the following examples, in which all units of quantity are by weight unless otherwise indicated.

EXAMPLE I

A reaction flask was charged with a particulate mixture of 3 parts of "Ethocel," a commercially available ethyl cellulose having an ethoxy content of 48.0% to 49.5% and a viscosity of 50 cps. at 20° C. as measured by a 5% solution in a 60:40 mixture of toluene and ethanol, 3 parts of "Myvacet 5–00," a commercially available diacetylated stearyl glyceride, and 1 part of calcium stearate. The reaction flask was placed in an oil bath and gradually heated, with stirring. The composition started to melt at a temperature of 90° C. to 110° C. At 130° C., the mixture was completely melted and formed a homogeneous although extremely viscous mixture. At temperatures of 140° to 150° C., a thin film was readily drawn from the fluid melt. On cooling to room temperature, a thin, strong, and flexible film was obtained. At temperatures above 170° C., some decomposition of the blend was observed. The water vapor permeability at room temperature of films prepared from the described composition was 30% to 40% less than similarly prepared films of "Ethocel" having equivalent thicknesses.

The foregoing procedure was repeated employing a 3:1 mixture of "Ethocel" and calcium stearate. The composition decomposed before any melting was observed. The foregoing procedure was repeated employing a 1:1 mixture of "Ethocel" and "Myvacet 5–00"; although a melt was obtained, no films could be drawn from the melt because of its high melt viscosity.

EXAMPLE II

The procedure recited in the first paragraph of Example I was repeated employing aluminum stearate instead of calcium stearate. Substantially the same results were obtained.

EXAMPLE III

Dehydrated food bars of chicken and rice, cottage cheese, orange juice, applesauce, and mushroom soup, 3 x 1.5 x about 1 inch, were curtain-coated employing the "Eastoflow" process. The coating composition comprised 37% of "Ethocell," 48% of "Myvacet 5–00," and 15% calcium stearate. The composition was extruded at a temperature of 300° F. into a curtain 12 inches wide, 5–15 mils thick. The food bars were placed on a vacuum suction plate and the extruded molten curtain was passed over the food bars at a rate of 24–30 inches/minute. The bars were then turned over and recoated to obtain a uniform coating on all sides. The coating thickness varied from 5 to 8.0 mils and the coating completely enveloped the food bar. The food bars were rehydrated by immersing in water at a temperature in the range of 180 to 200° F. for a period in the range of 15 to 120 min., and were rehydrated to substantially the same extent as uncoated food bars. The coated food bars were dropped from a height of 6 feet, without shattering. On storage for two months at 40° C., 48% relative humidity, the moisture content of the coated food product varied, on the average, but slightly from the original moisture content of the food bars, either increasing or decreasing, while the uncoated food products showed increases in moisture content of at least two times the original moisture content, and in some cases increases as much as six times the original moisture content.

EXAMPLE IV

A solution of 3 parts of "Ethocel," 3 parts of "Myvacet 5–00," and 1 part of calcium stearate in 93 parts of trichloromethane was prepared. Freeze-dried strawberries were suspended in an air stream at a temperature of about 127° F. The suspended strawberries were continuously sprayed at a rate of 60 cc./minute. When removed from the spraying zone, the air-suspended strawberries dried almost instantly, leaving a continuous coating on the strawberries.

The foregoing examples have illustrated the formation of the coating compositions of the present invention, their ability to be extruded into strong and resilient films, and the application of such coating compositions to food products. Employing the described procedures, similar results are obtained with other glycerides having the above-stated formula, other metal salts of fatty acids, as well as with methyl cellulose instead of the specific materials employed in the foregoing examples. Other suitable coating techniques will be apparent to those skilled in the art and it is intended to include such within the scope of the invention described. The utility of the coating compositions of the present invention in the protection of food products is self-evident from the foregoing description.

It is to be understood that the foregoing detailed description is given merely by way of illustration, and it is not intended to limit the scope of the present invention thereto, except as defined in the appended claims.

What is claimed is:

1. A coating composition comprising a homogeneous blend of (a) 25% to 50% by weight of the total composition of a cellulose ether, said cellulose ether containing from 2.1 to 2.7 ether groups per glucose unit, said ether groups being methoxy or ethoxy groups; (b) 25% to 60% by weight of the total composition of a glyceride having the formula:

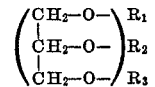

wherein $R_1$ is an acyl radical derived from a fatty acid having 8–20 carbon atoms per molecule, $R_2$ is an acyl radical derived from a lower aliphatic carboxylic acid having 1–8 carbon atoms, and $R_3$ is hydrogen or an $R_2$ radical; and (c) from 5% to 25% by weight of the total composition of a metal salt of a fatty acid having from 16–22 carbon atoms.

2. The coating composition of claim 1, wherein the glyceride is a diacetylated monoglyceride of a fatty acid.

3. The coating composition of claim 1, wherein the cellulose ether is ethyl cellulose having an ethoxy content of 45% to 50% by weight of the cellulose ether.

4. The coating composition of claim 1, wherein the metal salt is an alkaline earth metal salt or an earth metal salt.

5. The coating composition of claim 1, wherein from 35% to 40% of ethyl cellulose having an ethoxy content of 45% to 50% by weight of the cellulose ether, from 45% to 55% by weight of diacetylated monoglyceride of a fatty acid having 12–18 carbon atoms and from 15% to 20% of an alkaline earth metal or earth metal salt of a fatty acid having from 16–22 carbon atoms is employed.

6. The coating composition of claim 5, wherein the metal salt is calcium stearate.

7. The coating composition of claim 5, wherein the metal salt is aluminum stearate.

8. The coating composition of claim 5, wherein the acetylated monoglyceride is diacetyl glycerol monostearate.

9. The method of preparing a coated food product which comprises forming a homogeneous melt of the coating composition of claim 1 and coating a solid food product with in extruded molten sheet of the coating composition.

10. The method of preparing a coated food product which comprises forming a homogeneous melt of the coating composition of claim 5 and coating a solid food product with an extruded molten sheet of the coating composition.

11. A food product coated with the composition of claim 1.

12. A food product coated with the composition of claim 5.

13. A dehydrated food product coated with the composition of claim 1.

14. A dehydrated food product coated with the composition of claim 5.

References Cited

UNITED STATES PATENTS

| | | | |
|---|---|---|---|
| 1,607,474 | 11/1926 | Mork | 117—166 |
| 2,561,893 | 7/1951 | Van Wyck | 106—178 |
| 2,943,069 | 6/1960 | Rosenbaum | 117—167 |

FOREIGN PATENTS

| | | |
|---|---|---|
| 837,410 | 6/1960 | England. |

A. LOUIS MONACELL, Primary Examiner

W. C. LAWTON, Assistant Examiner

U.S. Cl. X.R.

99—168, 169; 106—171; 117—166, 167